United States Patent [19]
Farineau et al.

[11] Patent Number: 5,127,608
[45] Date of Patent: Jul. 7, 1992

[54] SYSTEM FOR INTEGRATED PITCH AND THRUST CONTROL OF AN AIRCRAFT

[75] Inventors: Jacques Farineau; Panxika Larramendy, both of Toulouse, France

[73] Assignee: Aerospatiale Societe Nationale Industrielle, Paris, France

[21] Appl. No.: 788,461

[22] Filed: Nov. 6, 1991

[30] Foreign Application Priority Data

Nov. 6, 1990 [FR] France ............................ 90 13718

[51] Int. Cl.⁵ ............................................. B64C 13/18
[52] U.S. Cl. ................................. 244/76 R; 244/178; 244/195; 364/434; 364/463
[58] Field of Search .................... 244/76 R, 175, 177, 244/178, 180, 181, 182, 185, 186, 187, 188, 194, 195; 364/433, 434, 435, 442, 463; 318/583, 584; 73/69, 178 T

[56] References Cited

U.S. PATENT DOCUMENTS

| | | | |
|---|---|---|---|
| 3,512,737 | 5/1970 | Platt | 244/77 |
| 3,857,535 | 12/1974 | Osder | 244/195 |
| 4,110,605 | 8/1978 | Miller | 364/463 |
| 4,266,743 | 5/1981 | Kelley | 244/182 |
| 4,420,808 | 12/1983 | Diamond et al. | 364/434 |
| 4,598,888 | 7/1986 | Beteille | 244/76 R |
| 4,723,214 | 2/1988 | Frei | 244/76 R |
| 4,764,872 | 8/1988 | Miller | 244/181 |
| 4,937,754 | 6/1990 | Buisson et al. | 73/65 |
| 4,956,780 | 9/1990 | Sankrithi et al. | 244/181 |
| 4,964,599 | 10/1990 | Farineau | 244/195 |

FOREIGN PATENT DOCUMENTS

| | | |
|---|---|---|
| 0296951 | 12/1988 | European Pat. Off. . |
| 2245999 | 4/1975 | France . |
| 1477656 | 6/1977 | United Kingdom . |
| 2073114 | 10/1981 | United Kingdom . |

OTHER PUBLICATIONS

R. A. Hess et al., *Journal of Guidance and Control and Dynamics*, vol. 9, No. 6, (Nov. 1986), pages 614 to 619.
Electronics + Wireless World, vol. 96, No. 1652, (Jun. 1990), pages 470 to 478.

*Primary Examiner*—Galen Barefoot
*Attorney, Agent, or Firm*—Fisher, Christen & Sabol

[57] ABSTRACT

According to the invention each of the pitch and thrust commands is a linear combination, inter alia, of the trim setting and of the speed setting, and the control provided by the aircraft joystick is pitch rate control. Protection may be provided with respect to trim, angle of incidence, and vertical load factor.

16 Claims, 7 Drawing Sheets

SYSTEM FOR INTEGRATED PITCH AND THRUST CONTROL OF AN AIRCRAFT

The present invention relates to a system for integrated pitch and thrust control of an aircraft.

BACKGROUND OF THE INVENTION

French patent application No. 90 08479 filed Jul. 4, 1990 in the name of the present Applicant describes a system for integrated pitch and thrust control of an aircraft comprising:

first airfoils for pitch control actuated from a first actuator member associated with a first transducer delivering a first electrical signal representative of the trim setting;

at least one engine controlled from a second actuator member associated with a second transducer delivering a second electrical signal representative of a speed setting for said aircraft;

a plurality of second airfoils, at least some of which are capable of taking up different determined positions as a function of each stage of flight of the aircraft, defining particular aerodynamic configurations, with the choice of one or other of said aerodynamic configurations being obtained by actuating a third actuator member associated with a third transducer delivering a third electrical signal representative of the selected configuration;

means suitable for delivering a fourth electrical signal representative of the mass of said aircraft;

means suitable for delivering a fifth electrical signal representative of the distance along the longitudinal axis of said aircraft between the center of gravity of said aircraft and an origin; and means suitable for delivering sixth, seventh, eighth, ninth, and tenth electrical signals respectively representative of the instantaneous flight altitude, aerodynamic angle of incidence, pitch rate, longitudinal trim, and speed of said aircraft;

said control system being remarkable in that it includes:

a first calculation device receiving said first to sixth electrical signals together with said tenth electrical signal and delivering first and second linear combinations of said first and second electrical signals, with the coefficients given to said first and second electrical signals respectively in said first and second linear combinations depending on said third to sixth and tenth electrical signals;

a second calculation device receiving said third to tenth electrical signals and generating third and fourth linear combinations of said seventh to tenth electrical signals, the coefficients given to said seventh to tenth electrical signals respectively in said third and fourth linear combinations depending on said third to sixth and tenth electrical signals;

first adder means receiving said first and third linear combinations and adding them to form a pitch first electrical command applied to said first airfoils; and second adder means receiving said second and fourth linear combinations and adding them to form a thrust second electrical command applied to said engine.

A system for integrated pitch and thrust control is thus obtained in which each of the pitch and thrust commands is a linear combination including static parameters (trim setting and speed setting) and dynamic parameters (instantaneous speed, longitudinal trim, pitch rate, and angle of incidence). Such a system can thus reduce the workload on the pilot while simultaneously providing greater safety and improving the comfort of passengers in the aircraft.

An object of the present invention is to improve the above-outlined integrated control system, in particular to enable the trim of the aircraft to be locked in turbulence so long as said first actuator member is in a neutral position.

SUMMARY OF THE INVENTION

To this end, the present invention provides an integrated control system of the above type that is remarkable in that said first transducer comprises:

means for generating an eleventh electrical signal representative of the position of said first actuator member relative to a neutral position;

a memory receiving said eleventh electrical signal and causing it to correspond to a twelfth electrical signal representative of a pitch rate setting; and integration means receiving said twelfth electrical signal and integrating it to generate said first electrical signal representative of the trim setting.

Thus, the joystick (the first actuator member) provides control by setting the pitch rate at constant air speed. This means that when the pilot acts on the joystick, a rate of change of trim is selected: to obtain a total change of 10° in the trim, the pilot may, for example, hold the joystick in a position corresponding to a rate of change of trim equal to 5° per second for a period of 2 seconds, or indeed in a position corresponding to a rate of change of trim equal to 2° per second for a period of 5 seconds. In any event, once the desired trim has been reached and the pilot has returned the joystick to the neutral position, the aircraft is maintained at that trim until the pilot acts again on the joystick. Thus, so long as the joystick is in its neutral position, the trim of the aircraft is locked even if the aircraft encounters turbulence.

In addition to this advantage of locking the trim, piloting an aircraft by means of controlled pitch rate is also advantageous since pitch is a parameter that a pilot visualizes easily, unlike slope which is difficult for a pilot to be fully aware of. A pilot controlling pitch rate does not know what the trim setting is, instead, the trim of the aircraft is used as a reference for controlling pitch rate. It may also be observed that the static error between the real trim of the aircraft and the trim setting is cancelled by the pilot (by acting on the joystick until the desired trim is reached), such that there is no need to provide a return link for cancelling this particular static error.

Advantageously, said memory includes as many first correspondence tables between the eleventh and twelfth electrical signals as there are different aerodynamic configurations taken up by said second airfoils, and said memory receives said third electrical signal representative of said selected configuration from said third transducer such that said twelfth electrical signal corresponds at all times to the current configuration.

Preferably, said integration means include an integrator, an amplifier, and third adder means, the inputs of said integrator and said amplifier being connected to a common terminal receiving said twelfth electrical signal, and said integrator and said amplifier delivering their output signals to said third adder means which deliver said first electrical signal. Thus, said amplifier generates a phase advance signal enabling the airfoils to react immediately to a command coming from said first actuator member.

Further, if the control system of the invention is studied mathematically, it can be seen that its transfer function between the real trim of the aircraft and the trim setting (said first signal) at the output from said first transducer is of the type $1/(1+k1 \cdot p+k2 \cdot p^2)$, in which expression p is the Laplace transform variable and k1 and k2 are constants.

Thus, in an advantageous embodiment of said integrator means, account is taken of said transfer function to ensure simple behavior of the system between the real trim of the aircraft and the pitch rate setting. To this end, the gain selected for said amplifier is equal to ,1, and a first filter having a $1/(1+\tau p)$ function is provided which receives the output signal from said third adder means, a second filter having a $k2 \cdot p/(1+\tau p)$ function is provided receiving said twelfth signal, and fourth adder means are provided which receive the output signals from said first and second filters and which deliver said first electrical signal.

Thus, as shown below, the overall transfer function between the real trim of the aircraft and the pitch rate setting is equivalent to the function that would be given by a first order filter associated with an integrator.

It would also be observed that in this embodiment the response time of the integration means depends on the value of the time constant $\tau$ of said first and second filters. Consequently, varying said time constant makes it possible to control the response time of said integration means.

It can also be seen that said second filter provides direct transmission between said first actuator member (the joystick) and said calculator device. This feature makes it easy to associate protection means, e.g. trim, angle of incidence, or load factor protection means with a system in accordance with the present invention.

Particularly for the purpose of ensuring passenger comfort, it is preferable to prevent the trim actually taken up by the aircraft exceeding some maximum value, e.g. equal to 35°. To this end, another feature of the present invention provides:

a first switch connected between said means generating said eleventh electrical signal and said memory generating said twelfth electrical signal, said first switch interconnecting said means and said memory when in a first position;

a second table connected in parallel with said memory and suitable for causing said eleventh electrical signal to correspond to a thirteenth electrical signal representative of a trim setting, said first switch interconnecting said means generating said eleventh electrical signal and said second table when in a second position;

first control means for controlling said first switch;

first comparator means comparing said ninth electrical signal representative of the longitudinal trim with a trim protection reference value, said first comparator means controlling said first control means so that said first switch takes up its first and second positions, respectively, depending on whether a first difference between said ninth signal and said trim protection reference value is positive or else negative or zero;

a third table for causing said ninth signal representative of the longitudinal trim to correspond to a fourteenth electrical signal representative of a trim correction;

means for forming a second difference between said thirteenth and fourteenth electrical signals; and means for transmitting said twelfth electrical signal to said integration means when said first switch is in its first position, or for transmitting said second difference to said integration means when said first switch is in its second position.

Thus, when the real trim of the aircraft is less than said reference value for trim protection, the aircraft is controlled by pitch rate as explained above. In contrast, as soon as the real trim becomes equal or greater than said reference value for trim protection, then the aircraft is controlled by trim and the trim is limited. Under such circumstances, the trim command is transmitted to the pitch control surfaces via said second filter of said integration means.

In order to trigger trim protection before the real trim reaches a maximum value that is not to be exceeded, it is advantageous for the system to include means for adding a phase advance term proportional to said eighth electrical signal representative of pitch rate to said ninth signal representative of longitudinal trim prior to applying it to said first comparator means and to said third table. It has been observed that it is advantageous for said phase advance term to be equal to the product of said eighth electrical signal multiplied by the time constant of said first and second filters.

In addition, in order to ensure continuity of the commands applied to said pitch control surfaces when switching from pitch rate control to trim control with limitation, and vice versa, means are provided for correcting said first electrical signal on each occasion said first switch changes over.

In the above, it can be seen that the trim protection in the system of the invention is obtained without any basic change to said system: only the first transducer is modified. Such protection is thus easily added to the basic system.

On the same principles, the present invention provides for the possibility of angle of incidence protection or vertical load factor protection.

Thus, a system in accordance with the invention and fitted with angle of incidence protection includes:

a second switch connected between said means generating said eleventh electrical signal and said memory generating said twelfth electrical signal, said second switch interconnecting said means and said memory when in a first position;

a fourth table connected in parallel with said memory and suitable for making said eleventh electrical signal correspond to a fifteenth electrical signal representative of an angle or incidence setting, said second switch interconnecting said means generating said eleventh electrical signal and said fourth table when in a second position;

second control means for controlling said second switch;

second comparator means comparing said seventh signal representative of the angle of incidence with an angle of incidence protection reference value, said second comparator means controlling said second control means so that said second switch takes up its first and second positions respectively depending on whether a third difference between said seventh signal and said angle of incidence protection reference value is positive, or else in negative or zero;

a fifth table suitable for making said seventh signal representative of the angle of incidence correspond to a sixteenth signal representative of an angle of incidence correction;

means for taking a fourth difference between said fifteenth and sixteenth signals; and means for transmitting said twelfth electrical signal to said integration means when said second switch is in its first position, or for transmitting said fourth difference thereto when said second switch is in its second position.

Such a system for angle of incidence protection preferably includes means for adding phase advance terms respectively proportional to said eighth electrical signal representative of the pitch rate and to the time derivative of said tenth electrical signal representative of the speed of said aircraft to said seventh signal representative of the angle of incidence prior to its being applied to said second comparator means and to said fifth table. It may also include means for correcting said signal at the output of said integration means each time said second switch switches, thereby ensuring continuity in the commands applied to said first airfoils for pitch control in spite of said switching.

Similarly, in order to obtain vertical load factor protection, the following may be provided:

a third switch disposed between said means generating said eleventh electrical signal and said memory generating said twelfth electrical signal, said third switch interconnecting said means and said memory when in a first position;

a sixth table connected in parallel with said memory and suitable for causing said eleventh electrical signal to correspond to a seventeenth electrical signal representative of a vertical load factor setting, said third switch interconnecting said means generating said eleventh electrical signal and said sixth table when in a second position;

third control means controlling said third switch;

third comparator means comparing an eighteenth electrical signal representative of the actual vertical load factor of the aircraft with a reference value for vertical load factor protection, said third comparator means controlling said third control means in such a manner that said third switch takes up its first or second position respectively depending on whether a fifth difference between said eighteenth signal and said vertical load factor protection reference is positive or else is negative or zero;

fourth comparator means comparing said eleventh electrical signal to a reference value for protecting said first actuator member in displacement, said fourth comparator means controlling said third control means in such a manner that said third switch takes up its first position or its second position respectively depending on whether a sixth difference between said eleventh signal and said reference value for protecting said first control member in displacement is positive, or else is negative or zero;

said third control means imposing said first position on said third switch only if said fifth and sixth differences are simultaneously positive;

a seventh table suitable for causing said eighteenth signal representative of the current vertical load factor to correspond to a nineteenth signal representative of a vertical load factor correction;

means for forming a seventh difference between said seventeenth and nineteenth signals; and means for transmitting said twelfth electrical signal to said integration means when said third switch is in its first position, or for transmitting said seventh difference to said integration means when said third switch is in its second position.

Vertical load factor protection is thus obtained both in turbulence and following pilot action.

Such a vertical load factor protection system preferably includes means for adding a phase advance term proportional to said eighth electrical signal representative of the pitch rate to said eighteenth signal representative of the current vertical load factor prior to its being applied to said third comparator means and to said seventh table. It may also include means for correcting the output signal from said integration means on each occasion said third switch switches, thereby ensuring continuity in the commands applied to said first airfoils for pitch control, in spite of said switching.

It may be observed that like trim protection, angle of incidence protection and vertical load factor protection can be added to the control system of the invention without changing its structure and/or its adjustment.

In order to remedy any possible static error between the vertical load factor setting (the seventh difference) and the real vertical load factor of the aircraft, it is advantageous to provide static error correction means in the vertical load factor protection system. Advantageously, such means comprise:

an eighth table receiving said seventeenth signal and causing it to correspond to a twentieth electrical signal representative of a desired model for said vertical load factor;

means for forming the difference between said eighteenth electrical signal representative of the current vertical load factor and said twentieth electrical signal and for integrating said difference; and means for adding the integrated difference to said seventh difference.

When it is desired that the system of the present invention include trim protection, angle of incidence protection, and vertical load factor protection simultaneously, the following may be provided:

a four-position fourth switch replacing said first, second, and third switches, said fourth switch connecting said means that generate the eleventh electrical signal respectively to said memory, to said second table, to said fourth table, and to said sixth table when it is in its first position, its second position, its third position, and its fourth position; and fourth control means replacing said first, second, and third control means, and controlling said fourth switch in such a manner that it occupies:

its first position if said first, third, fifth, and sixth differences are all positive;

its second, third, or fourth positions respectively it said first, third, or at least one of said fifth and sixth differences is zero or negative; and that one of its second, third, and fourth positions which has priority if at least two of said first, third, fifth, and sixth differences are zero or negative.

BRIEF DESCRIPTION OF THE DRAWINGS

The figures of the accompanying drawings show clearly how the invention may be implemented. In the figures, identical references designate items that are similar.

DETAILED DESCRIPTION

Figure 1:
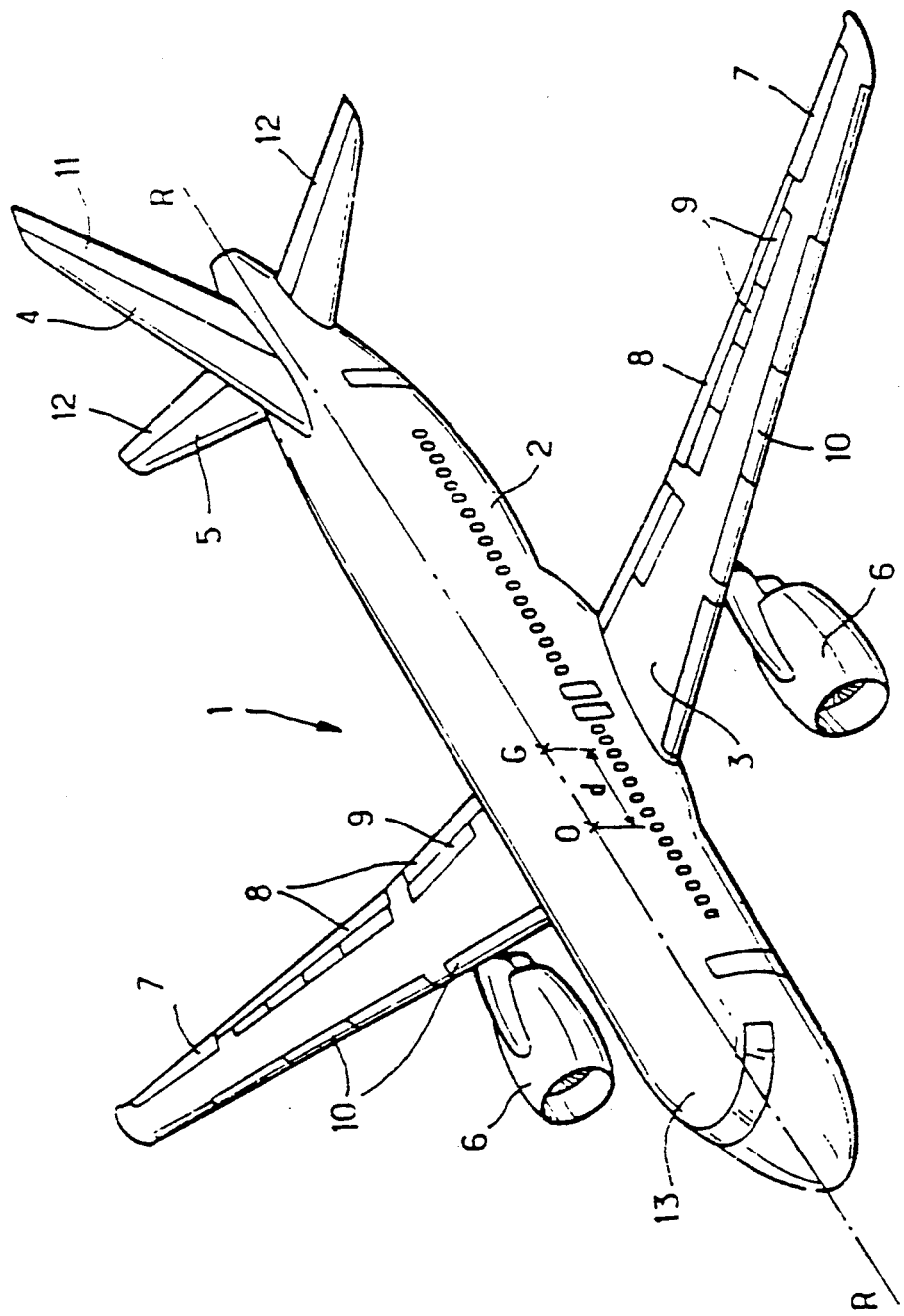
FIG. 1 is a perspective view from above of a civil airliner implementing the pitch and thrust control system of the present invention.

The civil airliner 1 shown in perspective in FIG. 1 comprises a fuselage 2, wings 3, a vertical tail fin 4, and a horizontal tail plane 5. It is propelled by two engines 6 mounted beneath its wings 3.

The top surfaces of the wings 3 are provided with trailing edge ailerons 7, flaps 8, deflectors 9, and leading edge slats 10. In conventional manner, some of the deflectors 9 can be used as airbrakes, and others as roll deflectors in combination with the ailerons 7. In addition, the deflectors 9 can be used as spoiler flaps and, optionally in co-operation with the ailerons 7, they may exert a load-lightening function to reduce the bending forces applied to said wings 3.

The vertical tail fin 4 is provided with a rudder 11, and pitch control surfaces 12 are hinged to the trailing edge of the horizontal tail plane 5. The tail plane 5 may itself be movable to form an adjustable horizontal stabilizer or plane suitable for use in controlling the pitch of the aircraft 1.

Figure 2:
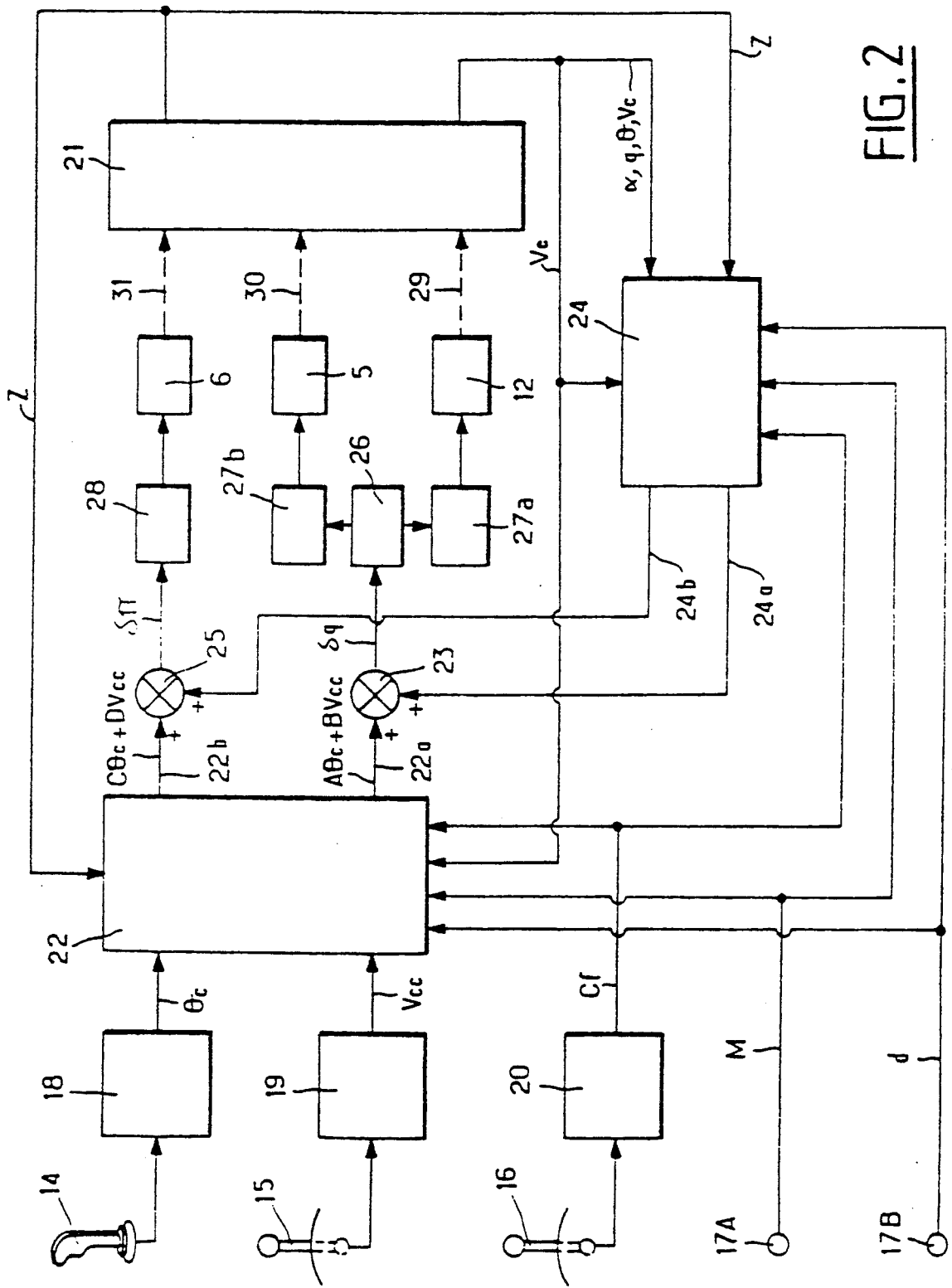
FIG. 2 is a block diagram of said pitch and thrust control system of the present invention.

For the purpose of controlling the pitch of the aircraft 1, at least one joystick 14 is provided in the cockpit 13 thereof for use by a pilot (see FIG. 2). The joystick 14 controls the pitch control surfaces 12 and, optionally, the horizontal tail plane 5.

In addition, to control the thrust of the engines 6, a throttle 15 is also provided in the cockpit 13.

The present invention relates only to controlling the engines 6 and the pitch control surfaces 12 (optionally together with the horizontal tail plane 5), and as a result the controls for the ailerons 7, the flaps 8, the deflectors 9, and the slats 10 are not described. It is merely recalled that in conventional manner and as a function of the stage of flight (cruising, landing, taking off, ... ), said airfoils 7 to 10 are either extended or else they are retracted, and that each particular stage of flight corresponds to a particular configuration in which some of said airfoils 7 to 10 (in particular the slats and the flaps) occupy determined extended positions and others occupy determined retracted positions, while the control dynamics of others of these airfoils (in particular the ailerons and the deflectors) depend on the configuration. Each of these configurations is selected by the pilot using a selector member 16 (see FIG. 2).

In addition, the aircraft 1 is provided with terminals 17A and 17B making electrical signals available respectively representative of the mass M of the aircraft 1 and of the distance d along the longitudinal roll axis R—R of the aircraft 1 between its center of gravity G and an origin O. Such electrical signals may come from setting devices (not shown) on which the pilot sets the magnitudes M and d at takeoff. Alternatively, the signal at terminal 17B may also come from a calculation device (not shown) that continuously calculates the position of the center of gravity G.

As shown in FIG. 2, the system of the present invention includes:

A transducer 18 transforming the position of the joystick 14 into an electrical signal and delivering such a signal at its output representative of the trim setting $\theta c$ desired by the pilot for the aircraft 1 and set by the pilot by corresponding actuation of the joystick 14;

a transducer 19 transforming the position of the throttle 15 into an electrical signal and delivering an output signal representative of the speed setting Vcc desired by the pilot for the aircraft 1 and set by the pilot by corresponding actuation of said throttle 15; and a transducer 20 transforming the position of the configuration-selector member 16 and delivering an output signal representative of the current configuration Cf as selected by the pilot by corresponding actuation of said member 16.

In addition, in conventional manner, the aircraft 1 carries a device 21 such as an Air Data Inertial Reference System (ADIRS) suitable for continuously delivering four electrical signals respectively representative of the instantaneous speed Vc, longitudinal trim $\theta$, pitch rate q, and angle of incidence $\alpha$ of the aircraft 1, said device 21 further including a radio altimeter or the like suitable for continuously delivering an electrical signal representative of flight altitude Z.

The various electrical signals defined above are designated below by the respective magnitudes that they represent.

As can be seen in FIG. 2, the system of the invention further includes a calculation device 22 receiving the signals $\theta c$, Vcc, Cf, M, d, Vc, and Z, and provided with two outputs 22a and 22b. The signal appearing at the output 22a of the device 22 is a linear combination of the signals $\theta c$ and Vcc, said combination being of the type $A\theta c + BVcc$, in which expression the coefficients A and B depend on the signals Cf, M, d, Vc and Z. Similarly, the signal that appears on the output 22b of the device is also a linear combination of the signals $\theta c$ and Vcc, of the type $C\theta c + DVcc$, in which expression the coefficients C and D depend on the signals Cf, M, d, Vc, and Z.

It can be seen that the calculation device 22 may comprise a table or matrix containing pluralities of sets of four coefficients A, B, C, and D, with a particular one of these sets being selected as a function of the instantaneous values of Cf, M, d, Vc, and Z. The particular set of four coefficients that is used may optionally be the result of interpolating as a function of the five above-mentioned instantaneous values between two sets A, B, C, and D stored in said table or matrix.

The signal $A\theta c + BVcc$ appearing at the output 22a of the calculation device 22 is applied to one of the inputs of an adder 23 whose other input receives a signal coming from the output 324a of the calculation device 24. This calculation device 24 receives the signals Cf, M, d, Z, $\alpha$, q, $\theta$, and Vc, and at its output 24a it delivers a linear combination of the signals $\alpha$, q, $\theta$, and Vc, of the type $a\alpha + bq + c\theta + dVc$, in which expression the coefficients a, b, c, and d depend on the signals Cf, M, d, Vc, and Z. Thus, at the output from the adder 23 there appears a signal $\delta q$ such that:

$$\delta q = A\theta c + BVcc + a\alpha + bq + c\theta + dVc \qquad (1)$$

In addition, the signal $C\theta c + DVcc$ appearing at the output 22b of the calculation device 22 is applied to one of the inputs of an adder 25 whose other input receives a signal coming from the other output 24b of the calculation device 24. This output 24b delivers a linear combination of the signals $\alpha$, q, $\theta$, and Vc, of the type $e\alpha + fq + g\theta + hVc$, in which expression the coefficients e, f, g, and h depend on the signals Cf, M, d, Vc, and Z. Thus, at the output of the adder 25, there appears a signal $\delta\pi$ such that:

$$\delta\pi = C74\,c + DVcc + e\alpha + fq + g\theta + hVc \qquad (2)$$

It can be seen that the calculation device 24 may comprise a table or matrix containing pluralities of sets of eight coefficients a, b, c, d, e, f, g, and h, with a particular one of these sets being selected as a function of the values of Cf, M, d, Vc, and Z.

The signal $\delta q$ obtained in this way and appearing at the output of the adder 23 is used as a pitch command for the aircraft 1. To this end, if the horizontal tail plane 5 is of the adjustable horizontal stabilizer type, the signal $\delta q$ is applied to a distributor device 26 whose purpose is to distribute said signal $\delta q$ between the control device 27a for the control surfaces 12 and the control device 27b of said variable horizontal tail plane as a function of the efficiencies specific to said adjustable horizontal stabilizer 5 and to the pitch control surfaces 12. Naturally, if the horizontal tail plane 5 is fixed, then the entire signal $\delta q$ is applied to the pitch control surfaces 12.

Similarly, the signal $\delta\pi$ calculated in the manner described above and appearing at the output of the adder 25 is used as a command for controlling the thrust of the engines 6 of the aircraft 1. To do this, the signal $\delta\pi$ is applied to the control device 28 therefor. The control device 28 may be of the Full Authority Digital Engine Control (FADEC) type, for example.

Naturally, the action of the horizontal tail plane 5, of the control surfaces 12, and of the engines 6 under the action of the signals $\delta q$ and $\delta\pi$ changes the values of $\alpha$, q, $\theta$, and Vc as detected by the device 21, and this is represented in FIG. 2 by dashed arrows 29, 30, and 31.

Thus, if the pilot acts on the joystick 14 to control the desired trim $\theta c$, the pitch command $\delta q$ takes account immediately of the value of this trim setting to actuate the pitch control surfaces 12 and/or the adjustable horizontal tail plane 5. The aircraft 1 thus takes up this trim $\theta c$ at a rate determined by the feedback concerning the angle of incidence $\alpha$, the pitch rate q, and the trim $\theta$ as determined by the terms $a\alpha$, bq, and $c\theta$ in above-defined expression (1). Simultaneously with the action on the pitch control surfaces 12 and/or on the adjustable horizontal tail plane 5, the thrust command $\delta\pi$ takes account of the value of the trim setting $\theta c$ because of the term $lC\theta c$, and also because of the feedback $e\alpha$, fq, and $g\theta$ in expression (2) which continuously adjusts the thrust of the engines 6 so that the change in trim takes place at constant speed. As a result, when trim is changed, the commands $\delta q$ and $\delta\pi$ are not influenced in any way by the feedback terms dVc and hVc.

If the pilot now acts on the throttle 15 to change the speed setting Vcc, the engines are immediately acted on by the command $\delta\pi$ and the same applies to the pitch control surfaces 12 and/or to the adjustable horizontal tail plane 5 because of the term BVcc in the command $\delta q$. As the speed of the aircraft 1 changes, the feedback terms dVc and $a\alpha$ in the command $\delta q$ influence the extent to which said pitch control surfaces 12 and/or said adjustable horizontal tail plane 5 are tilted so as to maintain constant trim $\theta c$, while feedback terms $e\alpha$ and hVc in the command $\delta\pi$ fix the rate at which the speed of the aircraft 1 changes.

If a longitudinal gust of wind (from in front or behind should occur, then there will be a change in Vc. Because of the terms dVc in the command $\delta q$ and hVc in the command $\delta\pi$, compensating changes (positive or negative) will appear in the speed and the trim of the aircraft 1. Under such circumstances, the angle of incidence $\alpha$, the pitch rate q, and the trim $\theta$ vary little, such that passenger comfort is ensured throughout the aircraft 1.

If a vertical gust of wind should occur, the angle of incidence $\alpha$ will change. The terms $a\alpha$ and $e\alpha$ in the commands $\delta q$ and $\delta\pi$ then enable longitudinal trim to be maintained and modify the thrust of the engines 6 to remain at constant speed.

Mathematical analysis of the integrated control system of the invention as described above with reference to FIG. 2 shows that with respect to the relationship between the real longitudinal trim $\theta$ of the aircraft 1 and the longitudinal trim setting $\theta c$, said system behaves as a second order filter whose transfer function is such that:

$$\theta/\theta c = 1/(1 + k1\cdot p + k2\cdot p^2) \qquad (3)$$

where k1 and k2 are constants and p is the Laplace transform variable.

Figure 3:
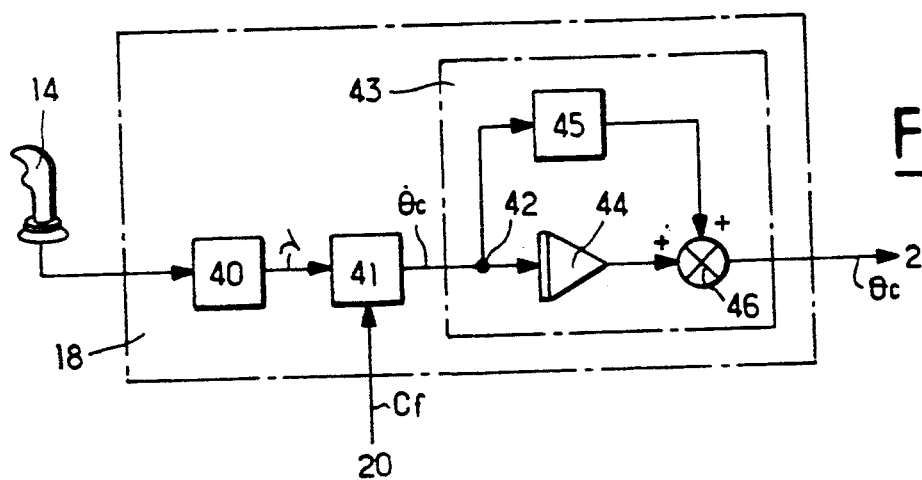
FIG. 3 is a block diagram of a first embodiment of said transducer delivering the trim setting for said aircraft from the joystick thereof.
Figure 4:
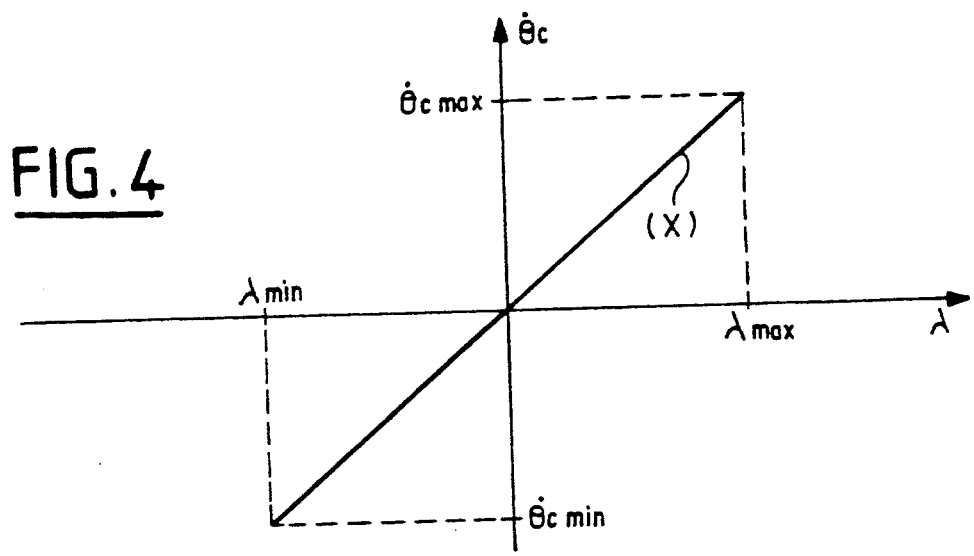
FIG. 4 is a graph for explaining the operation of the transducer in FIG. 3.

FIG. 3 is a block diagram of a first embodiment of the transducer 18 that delivers the trim setting $\theta c$. The transducer 18 includes a device 40, e.g. of the potentiometer type or the like, suitable for generating an electrical signal $\lambda$, representative of the position to which the joystick 14 has been tilted relative to a neutral position, and a memory 41 receiving said electrical signal $\lambda$ and the signal Cf from the transducer 20. For each possible configuration of the airfoils 7 to 10 and of the optional adjustable horizontal stabilizer 5, the memory 41 has a corresponding value for the reverence pitch rate $\dot{\theta}c$. As shown by curve (X) in FIG. 4 by way of non-limiting example, each value of $\lambda$ in a range between a minimum value $\lambda$ min and a maximum value $\lambda$max corresponds to a value of $\dot{\theta}c$ lying between a minimum value $\dot{\theta}c$ min and a maximum value $\dot{\theta}c$ max. Thus, the device 40 and the memory 41 serves to convert the position of the joystick 14 into a pitch rate setting. However, it is important to be able to retain maximum handling ability for the pilot using the joystick 14, and to this end, it is desirable, for example, that:

on receiving an instruction from the joystick 14 corresponding to maximum noseup tilting, it must be possible to achieve a load factor equal to 2.5 g in a smooth configuration, (i.e. when the flaps 8 and the slats 10 are in their neutral positions) or with slats 10 only extended, and a load factor equal to 2 g in other configurations; and on receiving an instruction from the joystick 14 corresponding to maximum nosedown tilting, it must be possible to achieve a load factor equal to $-g$ in a smooth configuration or with only the slats extended, and a load factor of 0 in other configurations.

It is therefore necessary to have a correspondence curve (X) between $\lambda$ and $\dot{\theta}c$ for each configuration of the airfoils 7 to 10.

The memory 41 thus contains as many correspondence tables (each representative of one curve (X)) as there are different configurations, with the appropriate table being selected as a function of the current configuration Cf, as identified by the transducer 20.

The contents of each table in the memory 41 is determined by theoretical calculation and is stored in said memory.

To be able to obtain the signal representative of the trim setting $\theta c$, the transducer 18 includes integration means 43 provided with an integrator 44. To avoid delay in generating the signal $\theta c$ due to the integrator 44, a phase advance amplifier 45 having a gain k is provided in parallel therewith and receives the reference pitch rate signal $\dot{\theta}c$ from a terminal 42 connected in common to the inputs of the integrator 44 and of said amplifier, together with an adder 46 connected to add together the output signals from the integrator 44 and the amplifier 45. As a result, the output from the adder 46 which constitutes the output from the transducer 18 applied to the calculation device 22 delivers an instantaneous trim setting value $\theta c$ in response to deflection of the joystick 14.

It can be seen that the transfer function of these integration means 43 is:

$$\theta c/\dot{\theta}c = (1+kp)/p \tag{4}$$

such that the overall transfer function of the system between $\theta$ and $\theta c$ is:

$$\theta/\dot{\theta}c = (1+kp)/p(1+k1p+k2p^2) \tag{5}$$

taking account of transfer function (3).

Figure 5:
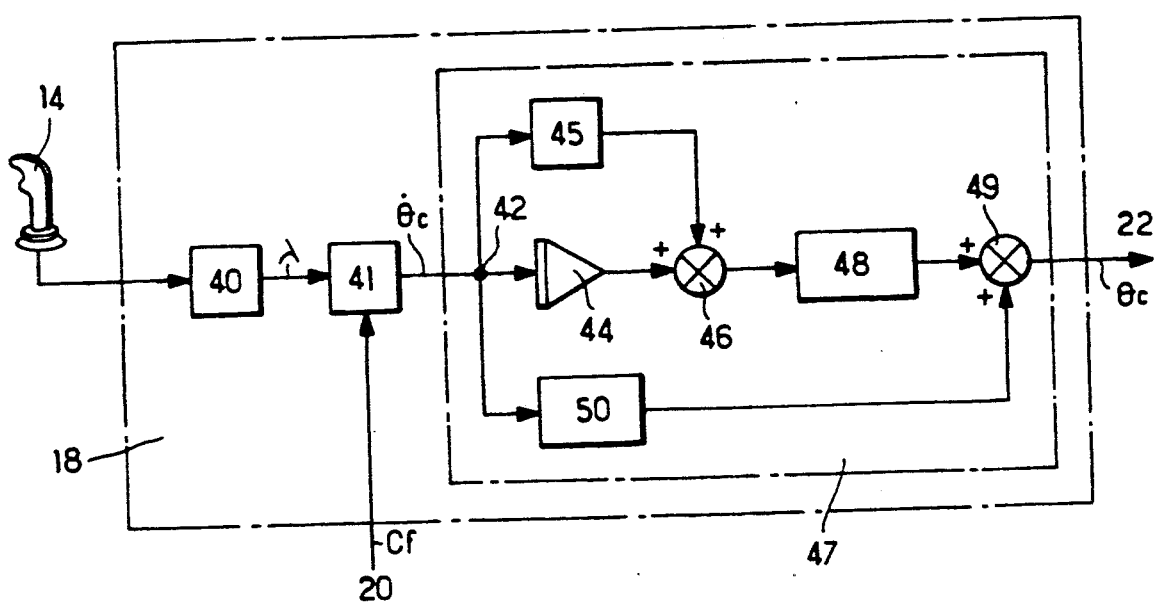
FIGS. 5 to 9 are block diagrams showing variant embodiments of said transducer.

In the variant embodiment of the transducer 18 shown in FIG. 5, there are the same device 40 and memory 41, but the integration means 47 are different from the integration means 43 of FIG. 3. Like the integration means 43, the integration means 47 include the above-described disposition of the integrator 44, the amplifier 45, and the adder 46. In this case the gain of the amplifier 45 is chosen to be equal to k1, and in addition a filter 48 is provided which receives the output from the adder 45 and which applies its own output signal to one of the inputs of another adder 49. The filter 48 has a function equal to $1/(1+\tau p)$, where $\tau$ is a time constant. In addition, the transducer 18 of FIG. 5 includes another filter 50 connected in parallel with the integrator 44, the adder 45, and the filter 48. The filter 50 receives the reference pitch rate signal $\dot{\theta}c$ from the common terminal 42 and its output is connected to another input of the adder 49. The function of the filter 50 is equal to $k2p/(1+\tau p)$ and the output from the adder 49 forms the output of the transducer 18 for application to the calculation means 22.

It is easy to show by calculation that the transfer function of the integration means 47 is:

$$\theta c/\dot{\theta}c = (1+k1p+k2p^2)/p(1+\tau p) \tag{6}$$

such that the overall transfer function of the system from $\theta$ to $\theta c$ is:

$$\theta/\dot{\theta}c = 1/p(1+\tau p) \tag{7}$$

Thus, the system for generating $\theta c$ from $\dot{\theta}c'$ as shown in FIG. 5 behaves as the association of an integrator (term in $1/p$) and a first order filter (term in $1/(1+\tau p)$).

In addition, by varying the time constant $\tau$ of the filters 48 and 50, the response time of the integration means 47 is varied and thus the forces on the control surfaces 12 and on the engines 6 are also varied. By controlling the time constant $\tau$ of the filters 48 and 50, it is possible to avoid pitch and thrust transients that would otherwise be generated by the transducer 18 having too short a response time.

Figure 6:
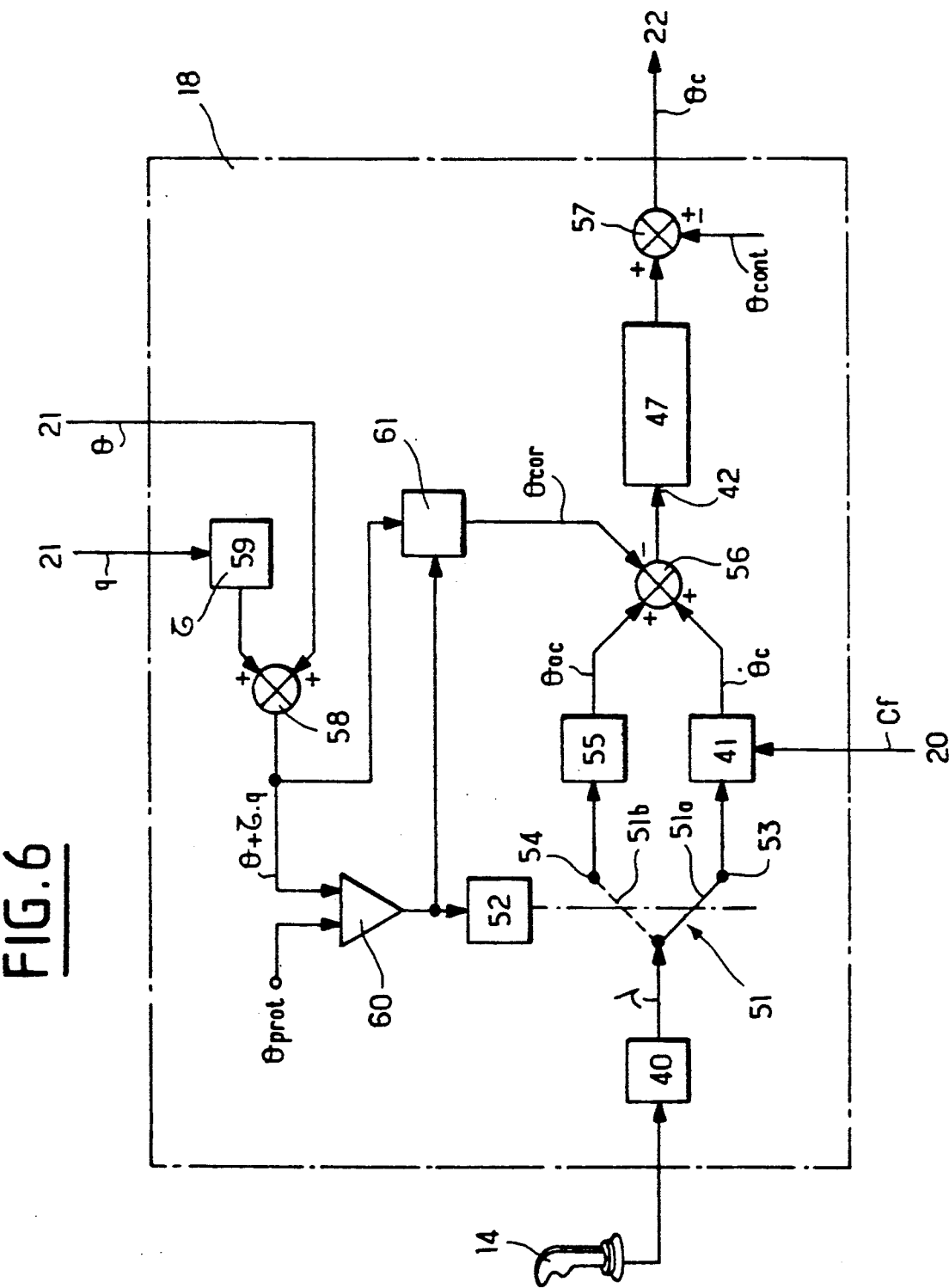

FIG. 6 shows another embodiment of the transducer 18 which includes trim protection. In this embodiment, the output from the device 40- actuated by the joystick 14 is connected to a two-position switch 51 having two positions 51a and 51b (shown in dashed lines) under the control of a control device 52. The output 53 from the switch 51 is connected to the above-described memory 41 which receives the signal Cf from the transducer 20. The output 54 of the switch 51 is connected to a table 55 suitable for delivering a trim setting value $\theta ac$ for all values of the signal $\lambda$ generated by the device 40. The outputs from the memory 41 and from the table 55 are connected to two positive inputs of an adder 56 which also includes a negative input. The output from the adder 56 is connected to the input 42 of the above-described integration means 47. The output from the integration means 47 is applied to a positive input of an adder 57 whose output constitutes the output of the transducer 18 and applies the trim set value $\theta c$ to the calculation device 22.

The transducer 18 of FIG. 6 also includes an adder 58 having two inputs on which it receives, respectively the current trim $\theta$ of the aircraft 1 from the ADIRS device 21, and the current pitch rate q of said aircraft via an amplifier 59. The gain of the amplifier 59 is advantageously equal to the time constant $\tau$ of the filters 48 and 50.

A signal $\theta + \tau q$ thus appears at the output of the adder 58, where the term $\tau q$ constitutes a phase advance for the term $\theta$.

In a comparator 60, the signal $\theta + \tau q$ is compared with a trim protection reference signal $\theta prot$, with the result of the comparison performed by the comparator 60 being applied to the control device 52 controlling the switch 51. If the signal $\theta + \tau q$ is less than $\theta prot$, then the control device 52 puts the switch 51 in its position 51a so that the signal $\lambda$ from the device 40 is applied to the memory 41. Otherwise, if the signal $\theta + \tau q$ is greater than or equal to $\theta prot$, the control device 52 puts the switch 51 in its position 51b so that said signal $\lambda$ is applied to the table 55.

In addition, the transducer 18 of FIG. 6 includes a table 61 receiving the signal $\theta + \tau q$ generated by the adder 58 and the output signal from the comparator 60, and generating on its output which is connected to the negative input of the adder 56, a trim correction value $\theta cor$ for each value of the signal $\theta + \tau q$, so long as the signal $\theta + \tau q$ is greater than or equal to the reference value $\theta prot$.

The transducer 18 of FIG. 6 thus operates as follows.

If the signal $\theta + \tau q$ is less than the reference value $\theta prot$, then the signal $\lambda$ is applied to the memory 41 which applies the signal $\dot{\theta}c$ to the integration means 47 via the adder 56 as happens in the embodiment of FIG. 5. The integration means 47 thus deliver the trim setting signal $\theta c$ to the calculation device 22 via the adder 57. Under such circumstances the adders 56 and 57 do not receive any signals other than those mentioned above and they therefore have no effect on the transmission of said signals $\dot{\theta}c$ and $\theta c$, such that the operation of the transducer 18 of FIG. 6 is identical to the operation of the transducer 18 in FIG. 5, under these circumstances.

In contrast, if the signal $\theta + \tau q$ is greater than or equal to the reference value $\theta prot$, then the signal $\lambda$ is applied to the table 55 and this table applies a trim setting value $\theta$ac to the adder 56. In addition, the table 61 applies a trim correction value $\theta$cor to said adder 56 such that the signal at the output from the adder 56 is then $\theta$ac$-\theta$cor. This signal passes through the integration means 47 via the filter 50 and, in the adder 57, a compensation signal $\theta$cont is added thereto or subtracted therefrom. Thus, the signal which then appears at the output of the device 18 in FIG. 6 is a trim setting signal $\theta$c equal to $\theta$ac$-\theta$cor$\pm\theta$cont. The purpose of the compensation signal $\theta$cont is to ensure that the pitch control surfaces 12 change from $\theta$c control to $\theta$ac$-\theta$cor control and vice versa without jolting. Continuity is thus ensured between normal $\theta$c control and trim protection control by means of said compensation signal $\theta$cont.

It can thus be seen that if it is desired to limit the trim $\theta$ of the aircraft to a maximum value $\theta$max (e.g. equal to 35°) in order to keep the passengers in the aircraft 1 comfortable, the phase advance term $\tau$q makes it possible to anticipate the trim protection process (switching the switch 51 from its position 512a to its position 51b) and to trigger said protection at a trim value equal to $\theta$prot which is less than $\theta$max (e.g. $\theta$prot is equal to 30°).

To protect trim, the signal $\theta$ac$-\theta$cor is determined so that $\theta$c is equal firstly to $\theta$prot when the joystick 14 is in its neutral position and secondly to $\theta$max when the joystick 14 is in its maximum nose-up position.

It may be observed that instead of being connected to a positive input of the adder 56, the output of the memory 41 could be connected directly to the input 42 of the integration means 47.

Figure 7:
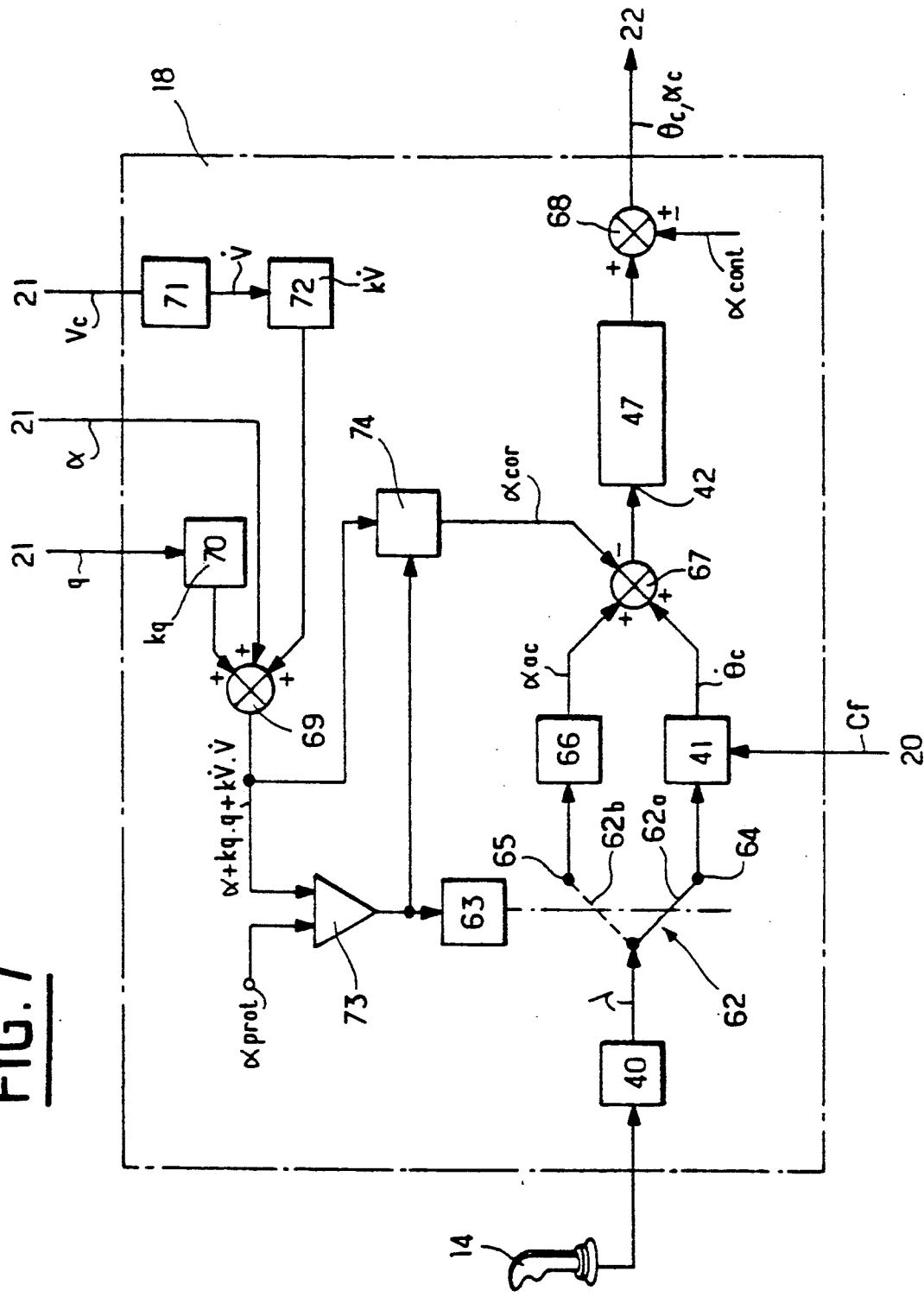

FIG. 7 shows yet another embodiment of the transducer 18, this time including angle of incidence protection to prevent the aircraft 1 from stalling. It can be seen that:

when the thrust from the engines 6 is not saturated the speed Vc of the aircraft 1 is constant such that its angle of incidence is under full control during steady conditions. However, during transient conditions, since the longitudinal trim reacts more quickly than the slope, the angle of incidence may reach values that are not acceptable and which must be limited; and for fixed or saturated thrust, when the nose of the aircraft 1 starts to go up, its speed decelerates and the loss of lift is compensated by an increase in the angle of incidence.

Thus, to avoid the excessive angles of incidence that may arise in the two above-mentioned cases, it is essential to provide a phase advance term concerning pitch rate q and a phase advance term concerning acceleration $\dot{V}$ to anticipate the first case and the second case respectively, as appears from the description below of the embodiment of the transducer 18 shown in FIG. 7.

In this embodiment, a two-position switch 62 having positions 62a and 62b (shown in dashed line) is provided at the output from the device 40 under the control of the joystick 14, with the switch being controlled by a control device 63. The output 64 of the switch 62 is connected to the above-described memory 41 receiving the signal Cf from the transducer 20. The output 65 of the switch 61 is connected to a table 66 suitable for delivering an angle of incidence set value $\alpha$ac for each value of the signal $\lambda$ generated by the device 40. The outputs from the memory 41 and the table 66 are connected to two positive inputs of an adder 67 which also includes a negative input. The output from the adder 67 is connected to the input 42 of the above-described integration means 47. The output from said integration means 47 feeds a positive input of an adder 68 whose output constitutes the output from the transducer 18 and applies either a trim set value $\theta$c or an angle of incidence set value $\alpha$c to the calculation device 22.

In addition, the transducer 18 of FIG. 7 includes an adder 69 having three inputs receiving the following respectively from the ADIRS device 21:

the current angle of incidence of the aircraft 1 over a direct link;

the current pitch rate q of said aircraft via an amplifier 70 of gain kq; and the speed Vc of said aircraft via a differentiator 71 and an amplifier 72 of gain k$\dot{V}$.

Thus, the output of the adder 69 provides a signal $\alpha+$kq·q$+$k$\dot{V}\cdot\dot{V}$ in which the terms kq · q and k$\dot{V}\cdot\dot{V}$ constitute phase advances for the term $\alpha$ ($\dot{V}$ being the time derivative of Vc given by the differentiator 71).

The signal $\alpha+$kq·q$+$k$\dot{V}\cdot\dot{V}$ is compared in a comparator 73 with an angle of incidence protection reference signal $\alpha$prot, and the result of the comparison performed by the comparator 73 is applied to the control device 63 controlling the switch 62. If the signal $\alpha+$kq·q$+$k$\dot{V}\cdot\dot{V}$ is less than $\alpha$prot, then the control device 63 puts the switch 62 into position 62a so that the signal $\lambda$ from the device 40 is applied to the memory 41. In contrast, if the signal $\alpha+$kq·q$+$k$\dot{V}\cdot\dot{V}$ is greater than or equal to $\alpha$prot, then the control device 63 puts the switch 62 into position 62b such that said signal $\lambda$ is then transmitted to the table 66.

In addition, the transducer 18 of FIG. 7 includes a table 74 receiving the signal $\alpha+$kq·q$+$k$\dot{V}\cdot\dot{V}$ generated by the adder 69 and the output signal from the comparator 73, and is suitable for generating an incidence correction value $\alpha$cor for each value of the signal $\alpha+$kq·q$+$k$\dot{V}\cdot\dot{V}$ which it applies to the negative input of the adder 56 if said signal is greater than or equal to the reference value $\alpha$prot.

The transducer 18 of FIG. 7 thus operates as follows.

If the signal $\alpha+$kq·q$+$k$\dot{V}\cdot\dot{V}$ is less than the reference value $\alpha$prot, then the signal $\lambda$ is applied to the memory 41 which applies the signal $\theta$c to the integration means 47 via the adder 67 as in the embodiment of FIG. 5. The integration means 47 thus apply the trim control signal $\theta$c to the calculation device 22 via the adder 68. Since the adders 67 and 68 do not receive any signals other than those mentioned above under these circumstances, they have no effect on the transmission of said signals $\theta$c and $\theta$c, such that the transducer 18 of FIG. 7 operates identically to the transducer 18 of FIG. 5 under such conditions.

In contrast, if the signal $\alpha+$kq·q$+$k$\dot{V}\cdot\dot{V}$ is greater than or equal to the reference value $\alpha$prot, then the signal $\lambda$ is applied to the table 66 which in turn applies an angle of incidence set value $\alpha$ac to the adder 67. In addition, the table 74 applies an angle of incidence correction value $\alpha$cor to said adder 67 such that the signal at the output from the adder 67 becomes $\alpha$ac$-\alpha$cor. This signal passes through the integration means 47 via the filter 50 and a compensation signal $\alpha$cont is added thereto or subtracted therefrom in the adder 68. Thus, the signal which appears at the output from the device 18 of FIG. 7 is an angle of incidence set signal $\alpha$c which is equal to $\alpha$ac$-\alpha$cor$\pm\alpha$cont. The purpose of the compensation signal $\alpha$cont is to ensure that the control surfaces 12 switch from $\theta$c control to $\alpha$ac$-\alpha$cor control and vice versa without jolting. Continuity between normal $\theta$c control and angle of incidence protection control is thus ensured by said compensation signal αcont.

It can thus be seen that if it is desired to limit the angle of incidence α to a maximum value αmax (e.g. equal to 15° in a landing configuration and to 17.5° in other configurations) for the purpose of avoiding stalling of the aircraft 1, then the phase advance terms kq·q and k$\dot{V}$·$\dot{V}$ make it possible to anticipate the angle of incidence protection process (switch 62 going from position 62a into 62b) and to trigger said protection at an angle of incidence equal to αprot which is less than αmax (e.g. αprot may be equal to 12°).

During angle of incidence protection, the signal αac−αcor is designed so that α is equal firstly to αprot when the joystick 14 is in its neutral position and secondly to αmax when the joystick 14 is in its maximum nose-up position.

It will easily be observed that the signal $\dot{\theta}$c from the memory 41 could be applied directly to the input 42 of the integration means 47 instead of passing through the adder 67.

Figure 8:
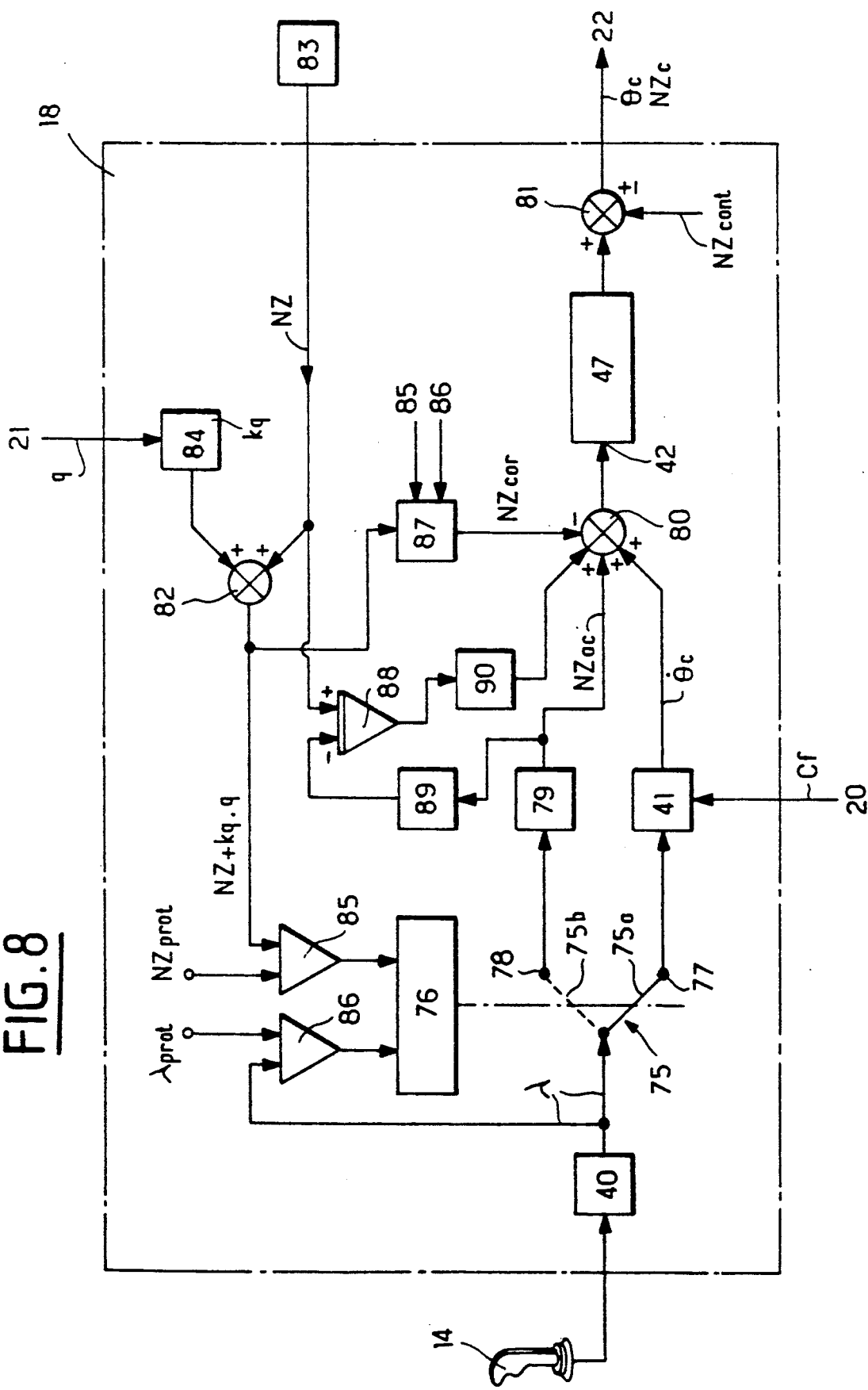

FIG. 8 shows yet another embodiment of the transducer 18, this time including vertical load factor protection. In this embodiment, the output from the device 40 actuated by the joystick 14 is connected to a two-position switch 75 having two positions 75a and 75b (shown in dashed lines), and under the control of a control device 76. The output 77 of the switch 75 is connected to the above-described memory 41 which receives the signal Cf from the transducer 20. The output 78 of the switch 75 is connected to a table 79 suitable for delivering a vertical load factor set value NAac for each value of the signal λ generated by the device 40. The outputs from the memory 41 and the table 79 are connected to two positive inputs of an adder 80 which includes another positive input, and a negative input. The output from the adder 80 is connected to the input 42 of the above-described integration means 47. The output of said integration means 47 is connected to a positive input of an adder 81 whose output constitutes the output from the transducer 18 delivering either a trim set value θc or else a vertical load factor set value NZc to the calculation device 22.

In addition, the transducer 18 of the FIG. 8 includes an adder 82 having two inputs respectively receiving an electrical signal representative of the instantaneous vertical load factor NZ as measured by accelerometers 83 on board the aircraft 1, and the current pitch rate q of said aircraft as delivered from the ADIRS device 21 via an amplifier 84 of gain kq.

The output of the adder 82 thus provides a signal NZ+kq·q in which the term kq·q constitutes a phase advance for the term NZ.

In the comparator 85, the signal NZ+kq·q is compared with a vertical load factor protection reference signal NZprot, and the result of the comparison performed by the comparator 85 is applied to the control device 76 controlling the switch 75. If the signal NZ+kq·q is less than NZprot, then the control device 76 causes the switch 75 to take up the position 75a, so that the signal λ from the device 40 is then applied to the memory 41. In contrast, if the signal NZ+kq·q is greater than or equal to NZprot, the control device 76 causes the switch 75 to take up its position 75b such that said signal λ is then transmitted to the table 79.

In addition, the system of FIG. 8 includes a further comparator 86 in which the signal λ from the device 40 is compared with a protection reference signal λprot, and the result of the comparison is applied to said control device 76 actuating the switch 75. If the signal λ is less than λprot, then the control device 76 causes the switch 75 to take up its position 75a such that the signal λ is applied to the memory 41. In contrast, if the signal λ is greater than or equal to λprot, then the control device 76 causes the switch 75 to take up its position 75b such that the signal λ is then applied to the table 79.

It therefore results that the control device 76 responds to instructions issued from both of the comparators 85 and 86. So long as one or other of the signals NZ+kq·q or λ is greater than or equal to the corresponding reference NZprot or λprot, then the switch 75 takes up its position 75b. In other words, the switch 75 occupies its position 75a only if both of said signals NZ+kq·q and λ are simultaneously less than their respective references NZprot and λprot.

In addition, the transducer 18 of FIG. 8 includes a table 87 receiving the signal NZ+kq·q generated by the adder 82, and also the output signals from the comparators 85 and 86, and is suitable for generating an output signal which is applied to the negative input of the adder 80, which output signal takes a vertical load factor correction value NZcor for each value of the signal NZ+kq·q so long as at least one of the signals λ and NZ+kq·q is greater than or equal to the corresponding reference value λprot or NZprot.

The transducer 18 of FIG. 8 thus operates as follows.

If the signal λ is less than the reference value λprot and if the signal NZ+kq·q is less than the reference value NZprot, then the signal λ is applied to the memory 41 which applies the signal $\dot{\theta}$c to the integration means 47 via the adder 80 as is the case in the embodiment of FIG. 5. The integration means 47 then apply the trim command θc to the calculation device 22 via the adder 81. Since the adders 80 and 81 are then receiving no signals other than those mentioned above, they have no effect on the transmission of said signals $\dot{\theta}$c and θc, such that the operation of the transducer 18 in FIG. 8 is identical to the operation of the transducer 18 in FIG. 5.

In contrast, if at least one of the signals λ and NZ+kq·q is greater than or equal to the corresponding reference value λprot or NZprot, then the signal λ is applied to the table 79 which in turn applies a vertical load factor set value NZac to the adder 80. In addition, the table 87 applies a vertical load factor correction value NZcor to said adder 80 such that the output signal from the adder 80 becomes NZac−NZcor. This signal passes through the integration means 47 via the filter 50 and a compensation signal NZcont is added thereto or subtracted therefrom in the adder 81. The signal which thus appears at the output of the device 18 in FIG. 8 is then a vertical load factor set signal NZc equal to NZac−NZcor±NZcont.

The purpose of the compensation signal NZcont is to ensure that the pitch control surfaces 12 switch from $\dot{\theta}$c control to NZac−NZcor control and vice versa without jolting. Continuity between normal $\dot{\theta}$c control and vertical load factor protection control is thus ensured by said compensation signal NZcont.

It can thus be seen that if it is desired to limit the vertical load factor NZ to a maximum value NZmax (e.g. 2 g) to ensure the comfort of passengers in the aircraft 1, then the phase advance term kq·q makes it possible to anticipate the protection process (the switch 75 passing from its position 75a to its position 75b) and to trigger said protection at a vertical load factor value equal to NZprot which is less than NZmax (e.g. NZprot equals 1.8 g). In addition, λprot may correspond to the joystick 14 being tilted through 12°.

As mentioned above for the systems of FIGS. 6 and 7, it can again be seen that the signal θc from the memory 41 need not pass through the adder 80 but could be applied directly to the input 42 of the integration means 47.

In addition, the system of FIG. 8 includes another table 89 receiving the signal NZac generated by the table 79. The table 89 contains a model of the desired load factor for the aircraft 1 and it delivers a value from this model for each value of the signal NZac that it receives. It applies this model value to the negative input of an integrator 88 whose positive input receives the signal NZ from the accelerators 83.

The difference integrated by the integrator 88, and multiplied by an appropriate gain in the amplifier 90 is applied to a positive input of the adder 80 to be added to the signal NZac or to the difference NZac−NZcor. Thus, the integral term generated by the integrator 88 ensures that the real load factor NZ is equal to the set load factor NZac−NZcor.

Naturally, ion the control system of the invention, it is possible for all three types of protection: trim, angle of incidence, and load factor, as described separately above with reference to FIGS. 6, 7, and 8, to be applied simultaneously.

Figure 9:
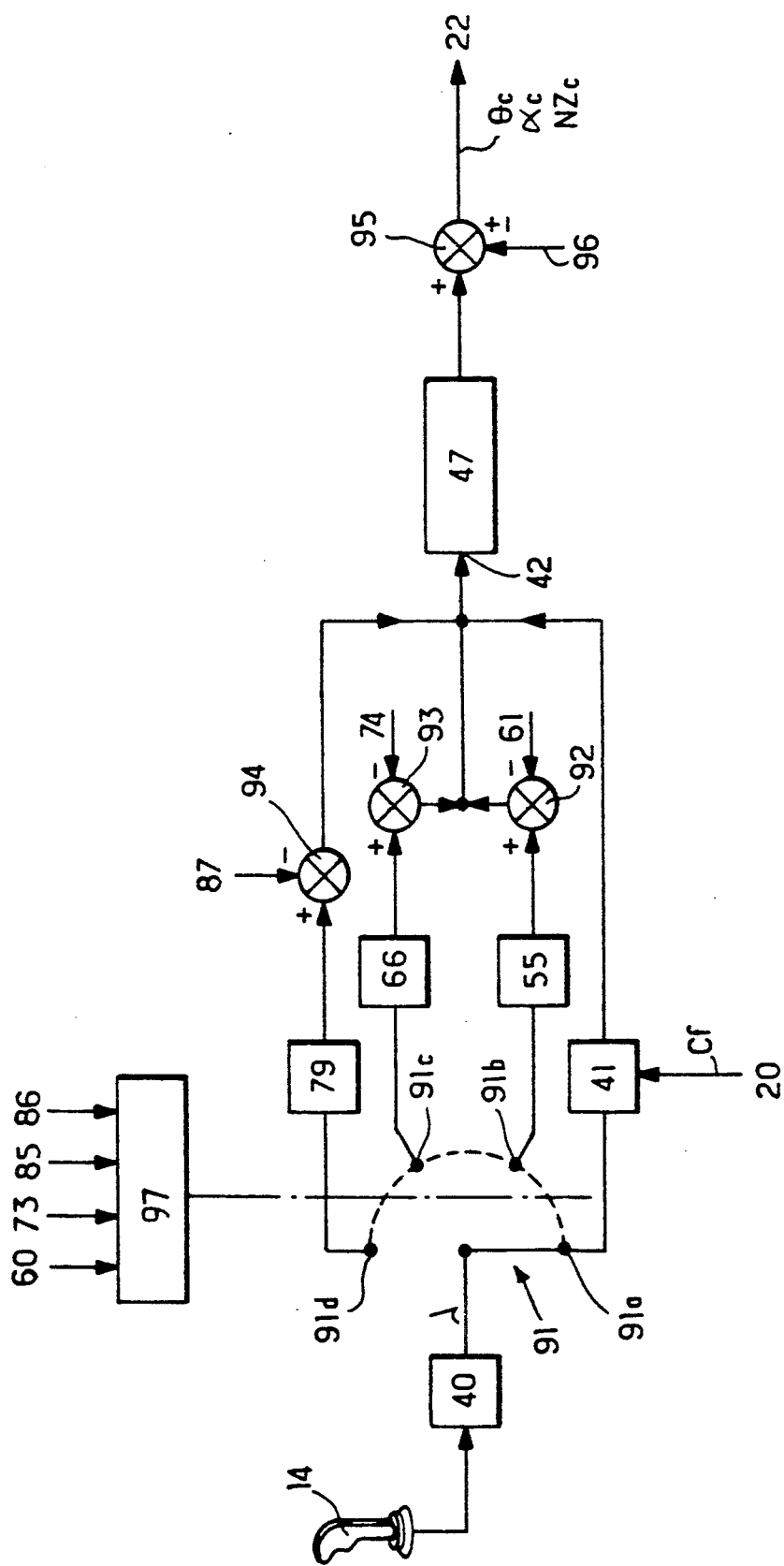

FIG. 9 shows means for combining all three types of protection, but it only includes those devices that are necessary for understanding.

To this end, the switches 51, 62, and 75 are replaced by a single four-position switch 91 having four positions 91a, 91b, 91c, and 91d. The memory 41 is connected firstly to position 91a of switch 91 and secondly directly to the input 42 of the integration means 47. The table 55 is connected to position 91b of the switch 91 and to an adder 92 receiving the signal θcor from the table 61 and replacing the adder 56. The table 66 is connected to the position 91c of the switch 91 and to an adder 93 which receives the signal αcor from the table 74 and replacing the adder 67. Finally, the table 79 is connected to the position 91d of the switch 91 and to an adder 94 receiving the signal NZcor from the table 87 and replacing the adder 80.

In addition, the control means 52, 63, and 76 are replaced by control means 97 which receive all four of the differences generated by the four comparators 60, 73, 85, and 86.

These control means are such that:

if all four differences are positive, the switch 91 occupies its position 91a such that the memory 41 receives the signal λ from the device 40 and applies its signal θc to the integration means 47;

if only one of the differences from the comparators 60 and 73 or if at least one of the differences from the comparators 85 and 86 is negative or zero, then the comparator 91 takes up the corresponding position 91b, 91c, or 91d, such that it is the corresponding table 55, 66, or 79 which receives the signal λ from the device 40 and which applies the corresponding signal θac−θcor, αac−αcor, or NZac−NZcor to the integration means 47; and if a plurality or all of said differences are negative or zero, then the switch 91 obeys a pre-established priority relationship and is controlled by said control means 97 to take up the highest priority one of its positions 91b, 91c, or 91d.

The output of the integration means 47 is connected to an adder 95 suitable for receiving the signal delivered thereby and for adding thereto or subtracting therefrom a compensation signal applied to its input 96 for the purpose of establishing control continuity whenever the switch 91 switches.

We claim:

1. A pitch and thrust control system for an aircraft the system comprising:

first airfoils for pitch control actuated from a first actuator member associated with a first transducer delivering a first electrical signal representative of the trim setting:

at least one engine controlled from a second actuator member associated with a second transducer delivering a second electrical signal representative of a speed setting for said aircraft;

a plurality of second airfoils capable of taking up different determined positions as a function of each stage of flight of the aircraft, defining particular aerodynamic configurations, with one or other of said aerodynamic configurations being selected by actuating a third actuator member associated with a third transducer delivering a third electrical signal representative of the selected configuration;

means suitable for delivering a fourth electrical signal representative of the mass of said aircraft;

means suitable for delivering a fifth electrical signal representative of the distance along the longitudinal axis of said aircraft between the center of gravity of said aircraft and an origin; and means suitable for delivering sixth, seventh, eighth, ninth, and tenth electrical signals respectively representative of the instantaneous flight altitude, aerodynamic angle of incidence, pitch rate, longitudinal trim, and speed of said aircraft;

said system including:

a first calculation device receiving said first to sixth electrical signals, together with said tenth electrical signal and delivering first and second linear combinations of said first and second electrical signals, with the coefficients given to said first and second signals respectively in said first and second linear combinations depending on said third to sixth and tenth electrical signals;

a second calculation device receiving said third to tenth electrical signals and generating third and fourth linear combinations of said seventh to tenth electrical signals, the coefficients given to said seventh to tenth electrical signals respectively in said third and fourth linear combinations depending on said third to sixth and tenth electrical signals;

first adder means receiving said first and third linear combinations and adding them to form a pitch first electrical command applied to said first airfoils; and second adder means receiving said second and fourth linear combinations and adding them to form a thrust second electrical command applied to said engine;

wherein said first transducer comprises:

means for generating an eleventh electrical signal representative of the position of said first actuator member relative to a neutral position;

a memory receiving said eleventh electrical signal and causing it to correspond to a twelfth electrical signal representative of a pitch rate setting; and integration means receiving said twelfth electrical signal and integrating it to generate said first electrical signal representative of the trim setting.

2. A system according to claim 1, wherein said memory includes as many first correspondence tables between the eleventh and twelfth electrical signals as there are different aerodynamic configurations, and wherein said memory receives said third electrical signal representative of said selected configuration from said third transducer such that said twelfth electrical signal corresponds at all times to the current configuration.

3. A system according to claim 1, wherein said integration means include an integrator, an amplifier, and third adder means, said integrator and said amplifier receiving said twelfth electrical signal and delivering their output signals to said third adder means which deliver sand first electrical signal.

4. A system according to claim 1, in which the transfer function between the real trim of the aircraft and said first signal is of the type $1/(1+k1\cdot+k2\cdot p^2)$, where p is the Laplace transform variable and k1 and k2 are constants, the system being wherein said integration means include:
- an integrator whose input is connected to a terminal receiving said twelfth electrical signal;
- an amplifier whose input is connected to said terminal receiving said twelfth electrical signal, said amplifier having a gain equal to k1;
- third adder means receiving the output signals from said integrator and said amplifier;
- a first filter having the function $11/(1+\tau p)$, where $\tau$ is a time constant, receiving the output signal from said third adder means;
- a second filter having the function $k2\cdot p/(1+\tau p)$, whose input is connected to said terminal receiving said twelfth electrical signal; and
- fourth adder means receiving the output signals from said first and second filters and delivering said first electrical signal.

5. A system according to claim 4, including:
- a first switch connected between said means generating said eleventh electrical signal and said memory generating said twelfth electrical signal, said first switch interconnecting said means and said memory when in a first position;
- a second table connected in parallel with said memory and suitable for causing said eleventh electrical signal to correspond to a thirteenth electrical signal representative of a trim setting, said first switch interconnecting said means generating said eleventh electrical signal and said second table when in a second position;
- first control means for controlling said first switch;
- first comparator means comparing said ninth electrical signal representative of the longitudinal trim with a trim protection reference value, said first comparator means controlling said first control means so that said first switch takes up its first and second positions, respectively, depending on whether a first difference between said ninth signal and said trim protection reference value is positive or else negative or zero;
- a third table for causing said ninth signal representative of the longitudinal trim to correspond to a fourteenth electrical signal representative of a trim correction;
- means for forming a second difference between said thirteenth and fourteenth electrical signals; and
- means for transmitting said twelfth electrical signal to said integration means when said first switch is in its first position, or for transmitting said second difference to said integration means when said first switch is in its second position.

6. A system according to claim 5, including means for adding a phase advance term proportional to said eighth electrical signal representative of the pitch rate to said ninth signal representative of the longitudinal trim prior to its being applied to said first comparator means and to said third table.

7. A system according to claim 6, wherein said phase advance term is equal to the product of said eighth electrical signal multiplied by the time constant of said first and second filters.

8. A system according to claim 5, including means for correcting said first electrical signal each time said first switch switches, thereby ensuring continuity in the commands applied to said first airfoils for pitch control in spite of said switching.

9. A system according to claim 4, including:
- a second switch connected between said means generating said eleventh electrical signal and said memory generating said twelfth electrical signal, said second switch interconnecting said means and said memory when in a first position;
- a fourth table connected in parallel with said memory and suitable for making said eleventh electrical signal correspond to a fifteenth electrical signal representative of an angle of incidence setting, said second switch interconnecting said means generating said eleventh electrical signal and said fourth table when in a second position;
- second control means for controlling said second switch;
- second comparator means comparing said seventh signal representative of the angle of incidence with an angle of incidence protection reference value, said second comparator means controlling said second control means so that said second switch takes up its first and second positions respectively depending on whether a third difference between said second signal and said angle of incidence protection reference value is positive, or else is negative or zero;
- a fifth table suitable for making said seventh signal representative of the angle of incidence correspond to a sixteenth signal representative of an angle of incidence correction;
- means for taking a fourth difference between said fifteenth and sixteenth signals; and
- means for transmitting said twelfth electrical signal to said integration means when said second switch is in its first position, or for transmitting said fourth difference thereto when said second switch is in its second position.

10. A system according to claim 9, including means for adding phase advance terms respectively proportional to said eighth electrical signal representative of the pitch rate and to the time derivative of said tenth electrical signal representative of the speed of said aircraft to said seventh signal representative of the angle of incidence prior to its being applied to said second comparator means and to said fifth table.

11. A system according to claim 9, including means for correcting said signal at the output of said integration means each time said second switch switches, thereby ensuring continuity in the commands applied to said first airfoils for pitch control in spite of said switching.

12. A system according to claim 4, including:
a third switch disposed between said means generating said eleventh electrical signal and said memory generating said twelfth electrical signal, said third switch interconnecting said means and said memory when in a first position;
a sixth table connected in parallel with said memory and suitable for causing said eleventh electrical signal to correspond to a seventeenth electrical signal representative of a vertical load factor setting, said third switch interconnecting said means generating said eleventh electrical signal and said sixth table when in a second position;
third control means controlling said third switch;
third comparator means comparing an eighteenth electrical signal representative of the actual vertical load factor of the aircraft with a reference value for vertical load factor protection, said third comparator means controlling said third control means in such a manner that said third switch takes up its first or second position respectively depending on whether a fifth difference between said eighteenth signal and said vertical load factor protection reference is positive or else is negative or zero;
fourth comparator means comparing said eleventh electrical signal to a reference value for protecting said first actuator member in displacement, said fourth comparator means controlling said third control means in such a manner that said third switch takes up its first position or its second position respectively depending on whether a sixth difference between said eleventh signal and said reference value for protecting said first control member in displacement is positive, or else is negative or zero;
said third control means imposing said first position on said third switch only if said fifth and sixth differences are simultaneously positive;
a seventh table suitable for causing said eighteenth signal representative of the current vertical load factor to correspond to a nineteenth signal representative of a vertical load factor correction;
means for forming a seventh difference between said seventeenth and nineteenth signals; and
means for transmitting said twelfth electrical signal to said integration means when said third switch is in its first position, or for transmitting said seventh difference to said integration means when said third switch is in its second position.

13. A system according to claim 12, including means for adding a phase advance term proportional to said eighth electrical signal representative of the pitch rate to said eighteenth signal representative of the current vertical load factor prior to its being applied to said third comparator means and to said seventh table.

14. A system according to claim 12, including means for correcting the output signal from said integration means on each occasion said third switch switches, thereby ensuring continuity in the commands applied to said first airfoils for pitch control, in spite of said switching.

15. A system according to claim 12, including;
an eighth table receiving said seventeenth signal and causing it to correspond to a twentieth electrical signal representative of a desired model of said vertical load factor;
means for forming the difference between said eighteenth electrical signal representative of the current vertical load factor and said twentieth electrical signal and for integrating said difference; and
means for adding the integrated difference to said seventh difference.

16. A system according to one of claims 5, 9 or 12, including:
a four-position fourth switch replacing said first, second, and third switches, said fourth switch connecting said means that generate the eleventh electrical signal respectively to said memory, to said second table, to said fourth table, and to said sixth table when it is in its first position, its second position, its third position, and its fourth position; and
fourth control means replacing said first, second, and third control means, and controlling said fourth switch in such a manner that it occupies:
its first position if said first, third, fifth, and sixth differences are all positive;
its second, third, or fourth positions respectively if said first, third, or at least one of said fifth and sixth differences is zero or negative; and
that one of its second, third, and fourth positions which has priority if at least two of said first, third, fifth, and sixth differences are zero or negative.

* * * * *